US008116515B2

(12) United States Patent
Takahata

(10) Patent No.: US 8,116,515 B2
(45) Date of Patent: Feb. 14, 2012

(54) IMAGE PROCESSING SYSTEM, COMPUTER READABLE MEDIA AND METHOD OF OUTPUTTING IMAGE DATA

(75) Inventor: Hirotsugu Takahata, Nagoya (JP)

(73) Assignee: Brother Kogyo Kabushiki Kaisha, Nagoya-shi, Aichi-ken (JP)

( * ) Notice: Subject to any disclaimer, the term of this patent is extended or adjusted under 35 U.S.C. 154(b) by 920 days.

(21) Appl. No.: 12/110,736

(22) Filed: Apr. 28, 2008

(65) Prior Publication Data

US 2011/0194153 A1    Aug. 11, 2011

(30) Foreign Application Priority Data

Apr. 26, 2007    (JP) .................................. 2007-116973

(51) Int. Cl.
*G06K 9/00* (2006.01)
(52) U.S. Cl. ................. 382/100; 726/2; 726/16; 726/26; 380/243
(58) Field of Classification Search .................. 382/100; 726/2, 16–21, 26–33; 380/243–246
See application file for complete search history.

(56) References Cited

U.S. PATENT DOCUMENTS

| 5,784,461 | A | * | 7/1998 | Shaffer et al. ................. 380/243 |
| 5,862,321 | A | * | 1/1999 | Lamming et al. ............. 709/200 |
| 6,111,659 | A | | 8/2000 | Murata |
| 6,857,067 | B2 | * | 2/2005 | Edelman ........................ 726/26 |
| 7,536,026 | B2 | | 5/2009 | Kaneda et al. |
| 2002/0054692 | A1 | | 5/2002 | Suzuki et al. |
| 2002/0184537 | A1 | | 12/2002 | Inokuchi et al. |
| 2003/0194204 | A1 | | 10/2003 | Hiroshi et al. |
| 2003/0210803 | A1 | | 11/2003 | Kaneda et al. |
| 2004/0184065 | A1 | | 9/2004 | Guan et al. |
| 2006/0067530 | A1 | | 3/2006 | Noguchi et al. |
| 2007/0038518 | A1 | | 2/2007 | Yokoyama |
| 2007/0127771 | A1 | | 6/2007 | Kaneda et al. |

FOREIGN PATENT DOCUMENTS

| CN | 1307313 A | 8/2001 |
| CN | 1450495 A | 10/2003 |
| CN | 1455582 A | 11/2003 |
| CN | 1779835 A | 5/2006 |
| JP | 9-200461 A | 7/1997 |
| JP | 2000-227883 A | 8/2000 |
| JP | 2003-087454 A | 3/2003 |
| JP | 2004-201069 A | 7/2004 |
| JP | 2006-050082 A | 2/2006 |
| JP | 2006-060484 A | 3/2006 |

(Continued)

OTHER PUBLICATIONS

JP Office Action dtd Jun. 2, 2009, JP Appln. No. 2007-116973, partial English Translation.

(Continued)

*Primary Examiner* — Wesley Tucker
(74) *Attorney, Agent, or Firm* — Banner & Witcoff, Ltd.

(57) ABSTRACT

A system includes a reading device configured to read an image on an original document, a first writing device configured to write image data read by the reading device into an image storage portion, a communication device configured to communicate with a separately-portable storage medium and a second writing device configured to transmit authentication information to the separately-portable storage medium, which is used to control output of the image data from the image storage portion.

16 Claims, 12 Drawing Sheets

FOREIGN PATENT DOCUMENTS

| | | | |
|---|---|---|---|
| JP | 2006-236190 | A | 9/2006 |
| JP | 2007-020155 | A | 1/2007 |

OTHER PUBLICATIONS

CN Office Action dtd Nov. 13, 2009, CN Appln. 200810092388.7, English Translation.

EP Search Report dtd Jul. 31, 2008, EP Appln. 08007962.7.

CN Office Action dtd Dec. 21, 2010, CN Appln. 200810092388.7, English translation.

CN Office Action dtd Jul. 14, 2011, CN Appln. 200810092388.7, English translation.

* cited by examiner

Fig. 4

MEMORY MANAGEMENT DATABASE

| MEMORY ID | APPROVAL STATUS |
|---|---|
| 10001 | APPROVED |
| 10002 | NOT APPROVED |
| 10003 | APPROVED |

Fig. 7

IMAGE DATABASE

| FILE NAME | MEMORY ID | VIEWING | PRINTING | STORAGE VIA NETWORK | STORAGE IN USB MEMORY | DELETION |
|---|---|---|---|---|---|---|
| ABCD.jpg | 10001 | PERMITTED | PERMITTED | NOT PERMITTED | NOT PERMITTED | PERMITTED |
| AM.jpg | 10003 | PERMITTED | PERMITTED | NOT PERMITTED | NOT PERMITTED | NOT PERMITTED |
| MMM.jpg | 10001 | PERMITTED | PERMITTED | PERMITTED | PERMITTED | NOT PERMITTED |
| AAA.jpg | 10002 | NOT PERMITTED | NOT PERMITTED | NOT PERMITTED | NOT PERMITTED | NOT PERMITTED |

IMAGE PROCESSING SYSTEM, COMPUTER READABLE MEDIA AND METHOD OF OUTPUTTING IMAGE DATA

CROSS REFERENCE TO RELATED APPLICATION

The present application claims priority from Japanese Patent Application No. 2007-116973, which was filed on Apr. 26, 2007, the disclosure of which is herein incorporated by reference in its entirety.

BACKGROUND

1. Field

Aspects of the invention relate to an image processing system, one or more computer readable media and a method of outputting image data.

2. Description of Related Art

A known image processing system as described in e.g., Japanese Laid-Open Patent Publication No. 9-200461 stores image data obtained by reading an original document in a transportable memory, e.g., a USB memory or in a computer connected to the image processing system. For example, when a classified or sensitive document is read and its image data is stored in e.g., a transportable memory, copies of the image data may be readily made and possibly used by other people improperly.

For example, Japanese Laid-Open Patent Publication No. 2007-20155 describes a technique of storing image data in a transportable memory with the image data encrypted and decrypting the encrypted image data using a password. By applying a technique described in Japanese Laid-Open Patent Publication No. 2007-20155 to the technique described in Japanese Laid-Open Patent Publication No. 9-200461, a security level of the image data can be improved.

However, if a user leaves a file of the decrypted image data in, e.g., a transportable memory, the image data may possibly be used by other people. An operation of inputting a password every time a user uses image data can be cumbersome.

SUMMARY

Illustrative aspects of the invention retain a security level of read image data.

In an image processing system according to an illustrative aspect of the present invention, image data obtained by reading an original document may be written into an image storage portion. Authentication information corresponding to the image data may be written into a separately-portable storage medium. When the authentication information exists in the separately-portable storage medium, output of the corresponding image data from the image storage portion may be permitted. When the authentication information does not exist in the separately-portable storage medium, output of the image data from the image storage portion may not be permitted. This structure may make it difficult for users who are not authorized to use the separately-portable storage medium in which the authentication information is written, to use the image data written into the image storage portion. Further, authentication may be conducted based on the authentication information written into the separately-portable storage medium, so that the number of operations required for users for authentication may be reduced.

In an image processing system according to yet another illustrative aspect of the present invention, when the authentication information exists in the separately-portable storage medium, output of the corresponding image data from the image storage portion may be permitted. When the authentication information does not exist in the separately-portable storage medium, output of the corresponding image data from the image storage portion may not be permitted.

In an image processing system according to still another illustrative aspect of the present invention, by referring to the image data stored in the separately-portable storage medium, the content of the original image data stored in the image storage portion may be readily understood. The image data stored in the separately-portable storage medium may be lower in fidelity with respect to its original image data, so that use of the image data stored in the separately-portable storage medium by itself may be difficult.

In an image processing system according to still yet another illustrative aspect of the present invention, when it is determined that an original document is not a particular document, output of the image data may be permitted. When it is determined that an original document is a particular document, the image data may be written into the image storage portion and the authentication information may be written into the separately-portable storage medium. Thus, output of image data e.g., whose confidentiality needs to be maintained, may be restricted. Output of other image data may not be restricted to enhance convenience for users.

In an image processing system according to a further illustrative aspect of the present invention, the separately-portable storage medium, into which the authentication information is written, may be a transportable storage medium.

In an image processing system according to yet a further illustrative aspect of the present invention, the image storage portion into which the image data is written may be a built-in storage device. Therefore, as compared with a case in which image data is written into an external storage device, a security may be enhanced.

In an image processing system according to still a further illustrative aspect of the present invention, read image data may be written into a storage device of an information processing device connected to the image processing system via a communication line. This may enable usage of image data from other information processing devices or printers, via a communication line.

In an image processing system according to still yet a further illustrative aspect of the present invention, security may be enhanced with access authentication to the image processing system and restriction of output of image data.

In an image processing system according to still another illustrative aspect of the present invention, access authentication information may be written into the separately-portable storage medium. The access authentication information may be read when the image data is output from the image storage portion. This may reduce user's operations to input the access authentication information.

In an image processing system according to still yet another illustrative aspect of the present invention, image data written into the image storage portion may be used by printing.

In an image processing system according to a further illustrative aspect of the present invention, image data written into the image storage portion may be used by viewing.

In an image processing system according to yet a further illustrative aspect of the present invention, a person having administrator authority may make approval with respect to outputs of image data, according to each of separately-portable storage media, which may improve increase security.

In an image processing system according to still a further illustrative aspect of the present invention, a person having administrator authority may permit output of the image data, based on the contents of the image data stored in the image storage portion. Therefore, output of image data may be appropriately restricted according to each image data.

Other aspects, features, and advantages will be apparent to persons of ordinary skill in the art from the following detailed description of the invention and the accompanying drawings.

BRIEF DESCRIPTION OF THE DRAWINGS

For a more complete understanding of the present invention, needs satisfied thereby, and the aspects, features, and advantages thereof, reference now is made to the following description taken in connection with the accompanying drawings.

FIG. 4 is a schematic showing the content of a memory registration database.

FIG. 7 is a schematic showing the content of an image database.

DETAILED DESCRIPTION

An illustrative embodiment of the present invention, and some illustrative features and advantages, may be understood by referring to FIGS. 1-12, with like numerals being used for like corresponding parts in the various drawings.

Referring to FIGS. 1-10, an image processing system, e.g., a multi-function device (MFD) 1 according to an illustrative embodiment of the present invention is discussed. MFD 1 may be configured to perform a scanner function, a printing function, a copying function, or a facsimile function, or any combination thereof.

Figure 1:
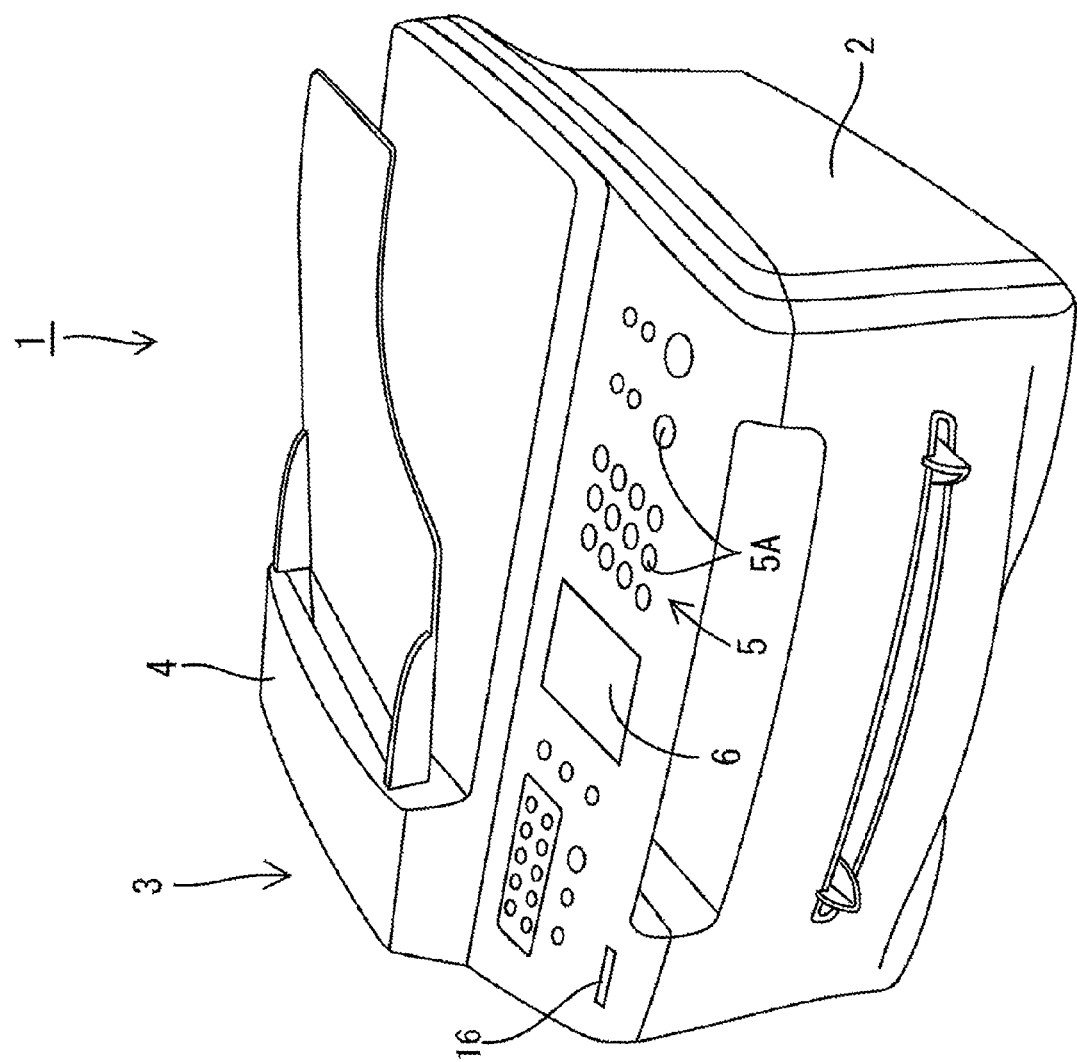
FIG. 1 is a perspective view of a multi-function device (MFD) according to an illustrative embodiment of the present invention.

Referring to FIG. 1, MFD 1 may include an image processing system, e.g., a reading unit 3, configured to read an original document. Reading unit 3 may be positioned at an upper portion of a case 2 of MFD 1. Reading unit 3 may be of a so-called flat bed type. Reading unit 3 may read an original document located on a document reading surface (not shown), with an image sensor, e.g., a contact image sensor (CIS). An auto-document feeder (ADF) 4 may be positioned above the document reading surface, so as to expose or hide the document reading surface. ADF 4 may be configured to feed an original document set therein to a position in which the image sensor is able to read the document.

The image sensor may include photodiodes arranged in an array. A light source may emit light to an original document to be read. Each photodiode may receive the light reflected off the original document and convert the reflected light intensity into an electric signal for each pixel. Reading unit 3 may convert the electric signal into digital data using an A/D converter (not shown) and output the digital data as image data.

MFD 1 may include a control panel 5, a display device, e.g., a display portion 6, and a USB interface 16 that may be positioned on an upper front portion of MFD 1. Control panel 5 may include a plurality of buttons 5A that allow a user to make various inputs using buttons 5A. Display portion 6 may include a liquid crystal display and a lamp. Display portion 6 may be configured to display, e.g., an operational status or a setting screen.

Figure 2:
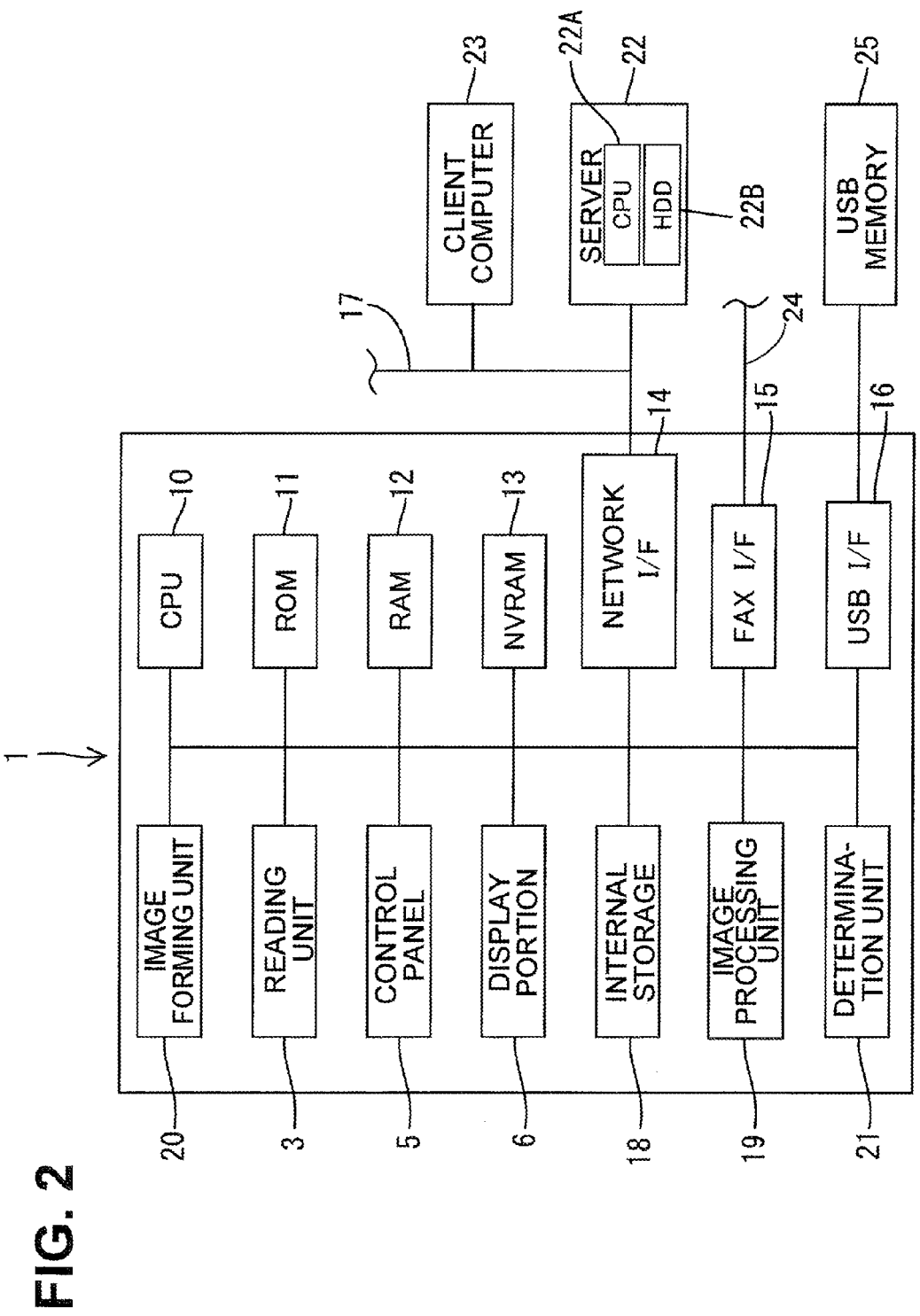
FIG. 2 is a block diagram showing an electrical configuration of the MFD of FIG. 1.

Referring to FIG. 2, MFD 1 may include a CPU (central processing unit) 10, a ROM (read-only memory) 11, a RAM (random access memory) 12, a NVRAM (Non-Volatile Random Access Memory) 13, a network interface 14, a facsimile interface 15, a USB interface 16, and internal storage 18, to which an image processing unit 19, an image forming unit 20 (e.g., printing device), and a determination unit 21, as well as reading unit 3, control panel 5, and display portion 6 are connected. CPU 10 may include modules stored in one or more computer readable storage media, which when executed by a processor, perform the functions of an authentication device, a writing device, a control device, an input device, an approval registration device, an approval device, a permission registration device and a permission device.

ROM 11 may store various programs to control operations of the MFD 1, e.g., a scanning process and a memory registration process, as will be described herein. CPU 10 may control various units or components of the MFD 1, based on programs read from ROM 11 while storing processing results in RAM 12 or NVRAM 13. Internal storage 18 may be a non-volatile storage device, e.g., a hard disk drive. Internal storage 18 may be configured to store, e.g., image data read by reading unit 3.

Network interface 14 may be connected to communication line 17. Communication line 17 may be connected to e.g., an information processing device, such as a server 22 including a CPU (central processing unit) 22A and a hard disk drive (HDD) 22B, and a client computer 23. This structure may enable intercommunication between the MFD 1, client computer 23 and server 22. Facsimile interface 15 may be connected to a telephone line 24. This structure may enable transmission of facsimile data to other facsimile devices. A USB memory 25 may be removably connected to USB interface 16. USB memory 25 is an example of a portable storage medium.

Image processing unit 19 may be configured to perform various image processing e.g., to convert image data read by reading unit 3 to a particular file format or convert image data read from USB memory 25 into print data suitable for printing. Image forming unit 20 may be configured to print an image, based on print data, onto a recording medium, e.g., a sheet of paper.

Determination unit 21 may be configured to determine whether an original document is a particular document, e.g., a classified or sensitive document whose confidentiality needs to be protected, by analyzing its image data output from reading unit 3. Determination unit 21 may be realized as hardware circuitry or as an executable software module. More specifically, the image data may be checked against predetermined image patterns, such as letters, symbols, and graphics stored in advance in NVRAM 13. When determination unit 21 determines that the image data contains an image pattern, it may determine that the original document is a classified or sensitive document.

Figure 3:
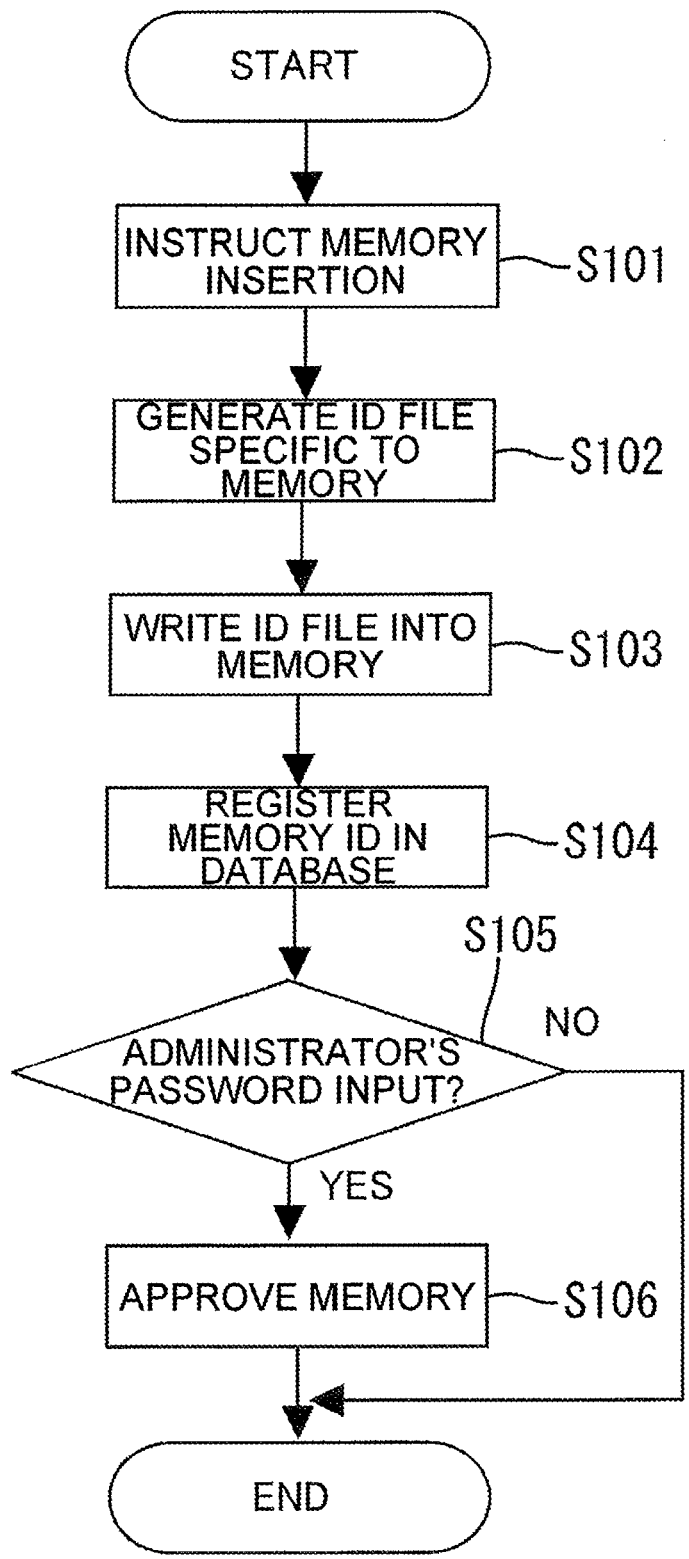
FIG. 3 is a flowchart showing a memory registration process according to an illustrative aspect.

Referring to FIGS. 3 and 4, a memory registration process is described in detail. The memory registration process may be performed by the CPU 10, as an approval registration device, to register each USB memory 25, which may be used to read a classified or sensitive document or output image data (e.g., viewing and printing) of the classified document, in a memory management database stored in advance in NVRAM 13. Referring to FIG. 4, the memory management database may have an ID number that is given individually to each USB memory 25 and its approval status information represented as "approved" or "not approved."

The memory registration process may start when a user, e.g., a person having administrator authority or another person, e.g., an owner of USB memory 25, performs a predetermined operation on control panel 5. Referring to FIG. 3, when the memory registration process starts, CPU 10 may display in display portion 6 a message encouraging the user to insert USB memory 25 that is to be registered in the memory management database, into USB interface 16 in S101. When USB memory 25 is inserted into USB interface 16, CPU 10 may generate an ID file specific to the USB memory 25 inserted into USB interface 16 in S102. CPU 10 may write the ID file into USB memory 25 in S103. The ID file may contain identification information for the MFD 1 to identify USB memories 25. At least the identification information may be encrypted. A predetermined program stored in ROM 11 may decrypt the encrypted identification information.

Then, in S104, CPU 10 may register in the memory management database, an ID number corresponding to USB memory 25 to which the ID file has been written. At the time of the ID number registration, the value of the approval status information corresponding to that USB memory 25 may be set to the value representing "not approved." CPU 10 may display in display portion 6 a message encouraging the user to input an administrator's password in S105. NVRAM 13 may store in advance an administrator's password that only a person having an administrator authority knows. When the administrator's password is input on control panel 5 (S105: YES), the value of the approval status information corresponding to USB memory 25 may be set to the value representing "approved" in S106. When the administrator's password is not input on control panel 5 (S105: NO), e.g., a person executing the memory registration process is a general user who does not have an administrator authority, the value of the approval status information may remain unchanged and set to the value representing "not approved." The administrator may refer to the contents of the memory management database stored in NVRAM 13 by operating e.g., control panel 5 or client computer 23 and changing the value of the approval status information representing "not approved" to the value representing "approved."

Referring to FIGS. 5-8, a scanning process executed under the control of CPU 10 is discussed.

Figure 5:
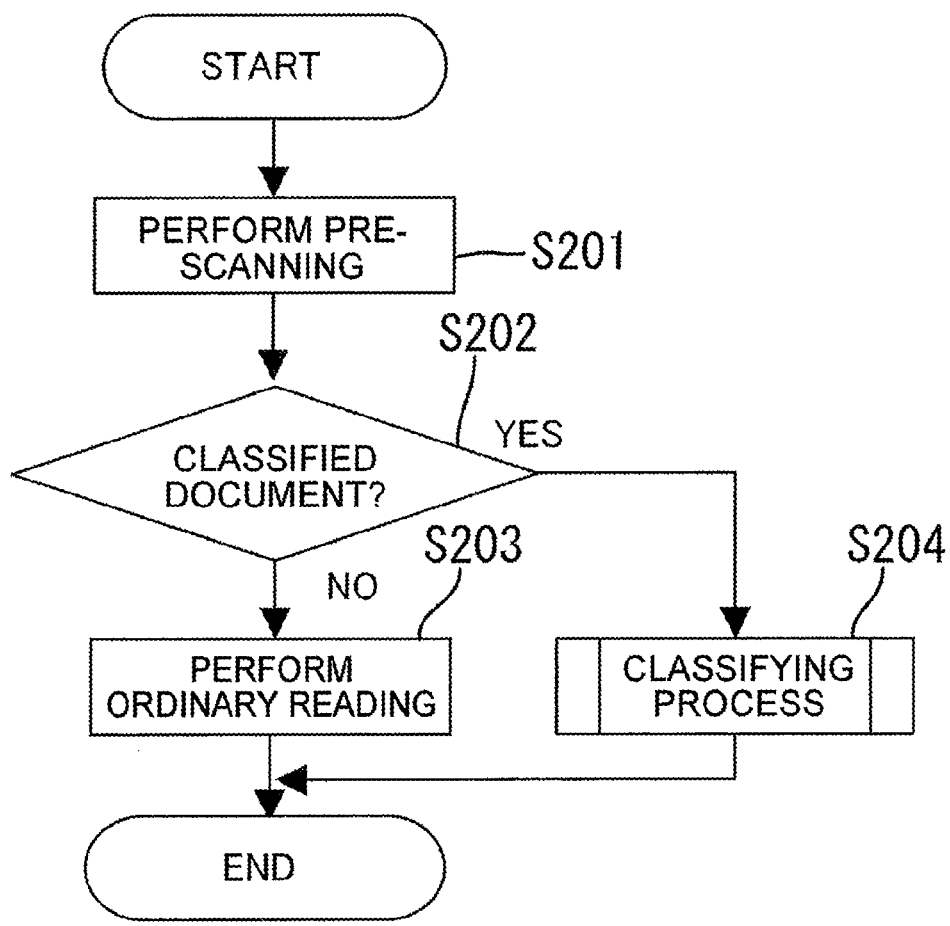
FIG. 5 is a flowchart showing a scanning process according to an illustrative aspect.

Referring to FIGS. 5-8, a scanning process executed under the control of CPU 10 is discussed in detail. The scanning process may start as a user inputs a scanning start instruction after the user sets an original document in reading unit 3 and inputs various reading settings, e.g., resolution of image data, a storage location, a file format for storage. Referring to FIG. 5, when the scanning process starts, CPU 10 may start pre-scanning the original document with reading unit 3 in S201. Pre-scanning may be performed based on reading settings suitable for determination by determination unit 21, unlike reading settings set by the user at the time of the scanning start instruction.

Then, determination unit 21 may determine in S202 whether the original document is a classified document, e.g., image data output from reading unit 3 contains a particular image pattern. When determination unit 21 determines that the original document is not a classified or sensitive document (S202: NO), ordinary image reading may be performed in S203 under control of the CPU 10 as a control device, based on the reading settings made by the user. Read image data may be stored in e.g., USB memory 25, internal storage 18, HDD 22B of server 22, or a hard disk drive of client computer 23, based on the user's setting.

Figure 6:
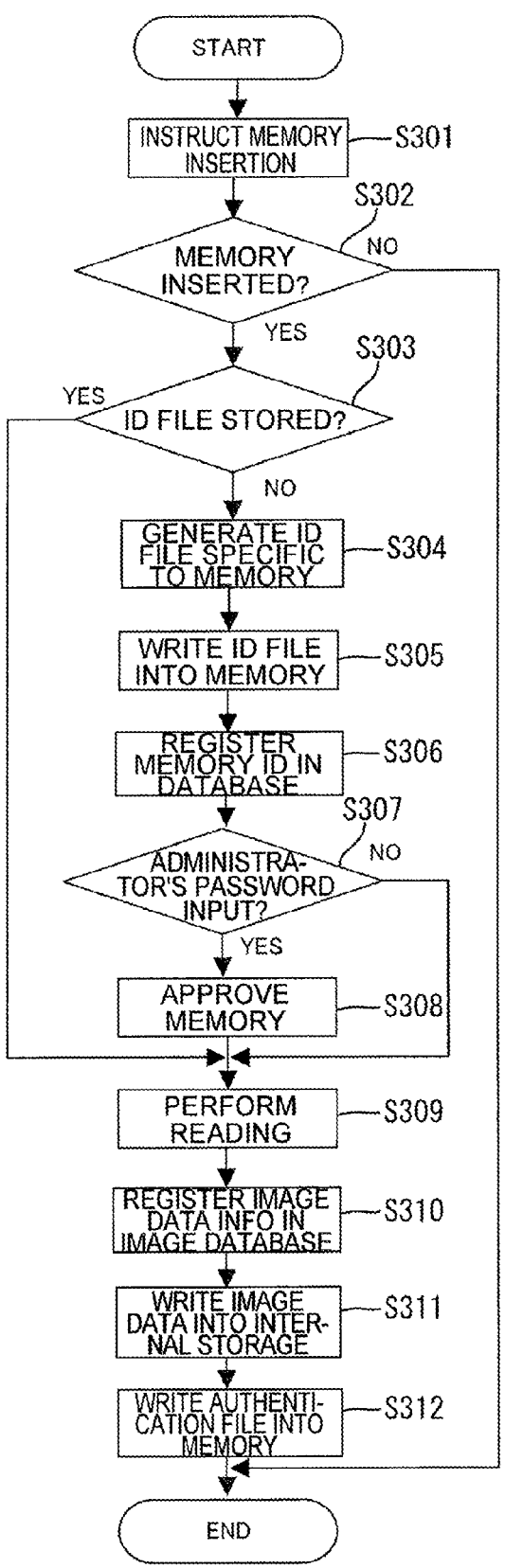
FIG. 6 is a flowchart showing a classifying process performed during the scanning process according to an illustrative aspect.

When determination unit 21 determines that the original document is a classified document (S202: YES), a classifying process may be performed in S204 under control of the CPU 10 as a control unit. Referring to FIG. 6, when the classifying process starts, CPU 10 may display in display portion 6 a message encouraging the user to insert USB memory 25 into USB interface 16 in S301. When USB memory 25 is not inserted into USB interface 16 (S302: NO), the classifying process may end without reading the original document based on the user's settings. When USB memory 25 is inserted into USB interface 16 (S302: YES), CPU 10 may determine whether an ID file with an ID number corresponding to the ID number stored in the memory management database, is be stored in USB memory 25 in S303.

When an ID file is not stored in USB memory 25 (S303: NO), similar steps to S102-S106 of the memory registration process may be performed in S304-S308. More specifically, CPU 10 may generate an ID file specific to USB memory 25 inserted into USB interface 16 in S304. CPU 10 may write the ID file to USB memory 25 in S305. Then, CPU 10 may register an ID number corresponding to USB memory 25 in the memory management database in S306. CPU 10 may display in display portion 6 a message encouraging the user to input an administrator's password in S307. When the administrator's password is input (S307: YES), the approval status information corresponding to USB memory 25 may be set to the value representing "approved" in S308.

When an ID file exists in USB memory 25 in S303 (S303: YES), the administrator's password is not input in S307 (S307: NO) and the value of the approval status information is not set to the value representing "approved" in S308 as these steps are skipped, and reading unit 3 may read the original document in S309. The original document may be read based on the user's settings that are made at the time of the scanning start instruction.

Information regarding the read image data may be registered in an image database stored in NVRAM 13 in S310. Referring to FIG. 7, the image database may contain a file name of image data to be written into internal storage 18 by the CPU 10 as a permission registration device, an ID number of USB memory 25 that is inserted when the original document is read, and data basis information indicating "permitted" or "not permitted" with respect to, e.g., viewing, printing, storage via network, and storage in USB memory, as well as the deletion of image data.

If the approval status information of USB memory 25 is set to the value representing "approved" in the memory management database when information regarding the read image data is registered in the image database, values of "viewing" and "printing" may be set to values representing "permitted" and values of "storage via network", "storage in USB memory" and "deletion" may be values representing "not permitted." If the approval status information of USB memory 25 is set to the value representing "not approved" in the memory management database when information regarding the read image data is registered in the image database, values of "viewing", "printing", "storage via network", "storage in USB memory" and "deletion" may be set to the value representing "not permitted."

Then, CPU 10, as a writing device, may write the image data read by reading unit 3 into internal storage 18 in S311. The image data may be read based on the user's settings, e.g., a resolution and a file format for storage. However, the image data may be stored in internal storage 18 regardless of the user's setting with respect to the storage location.

Figure 8:
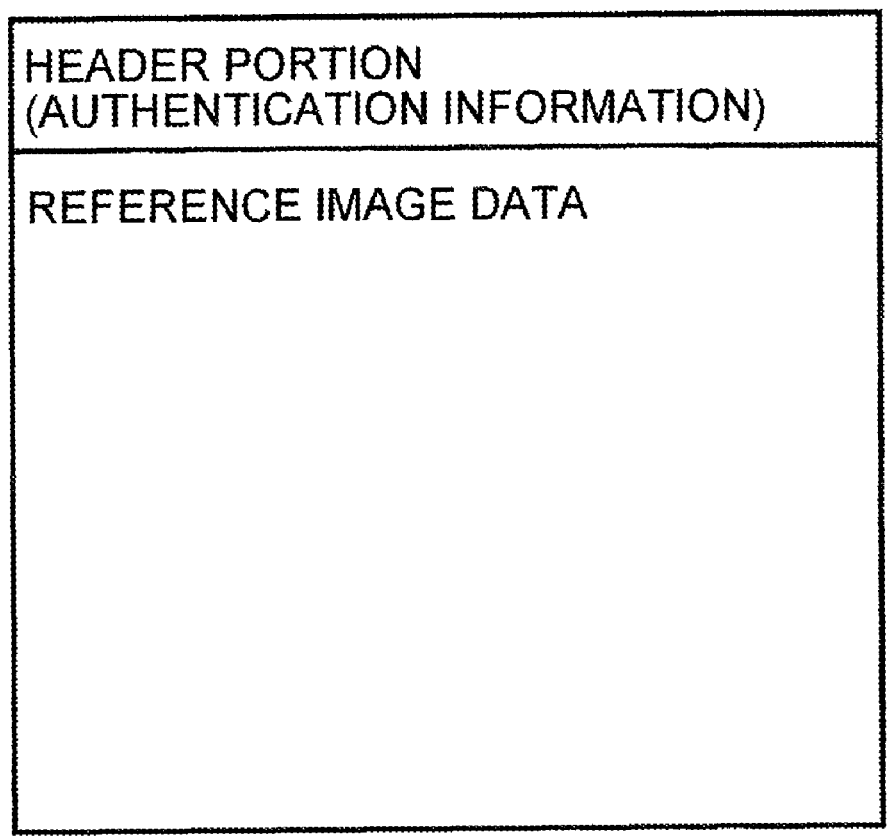
FIG. 8 is a schematic showing the content of an authentication file.

CPU 10 may generate an authentication file corresponding to the image data stored in internal storage 18. The authentication file may be written into USB memory 25 in S312 by a writing device, for example CPU 10. Referring to FIG. 8, the authentication file may be generated as an image file including reference image data with fidelity with respect to the image of the original document being lower than the image data stored in internal storage 18. The fidelity of image data may be lowered by e.g., reducing the size or resolution of the image data stored in internal storage 18, omitting a part of the image, reducing the number of colors to be used, or changing colors or shape of the image.

The authentication file may include a header portion. Authentication information including, e.g., a file name and storage location of the image data stored in internal storage 18 may be encrypted and embedded in the header portion. The encrypted authentication information may be decrypted by a predetermined application stored in ROM 11. If the authentication file is a JPEG or TIFF image file, the authentication information may be embedded in the header portion of the authentication file, based on e.g., the specification of Exchangeable Image File Format (EXIF).

If the user connects USB memory 25 having the authentication file stored therein during the scanning process, to e.g., client computer 23, the reference image data may be viewed by opening the authentication file with an image display application. Thus, contents of the image data stored in internal storage 18 may be readily identified. The authentication information embedded in the header portion may be encrypted. Therefore, the authentication information may not be identified under normal conditions. This structure may maintain enhanced security.

Figure 9:
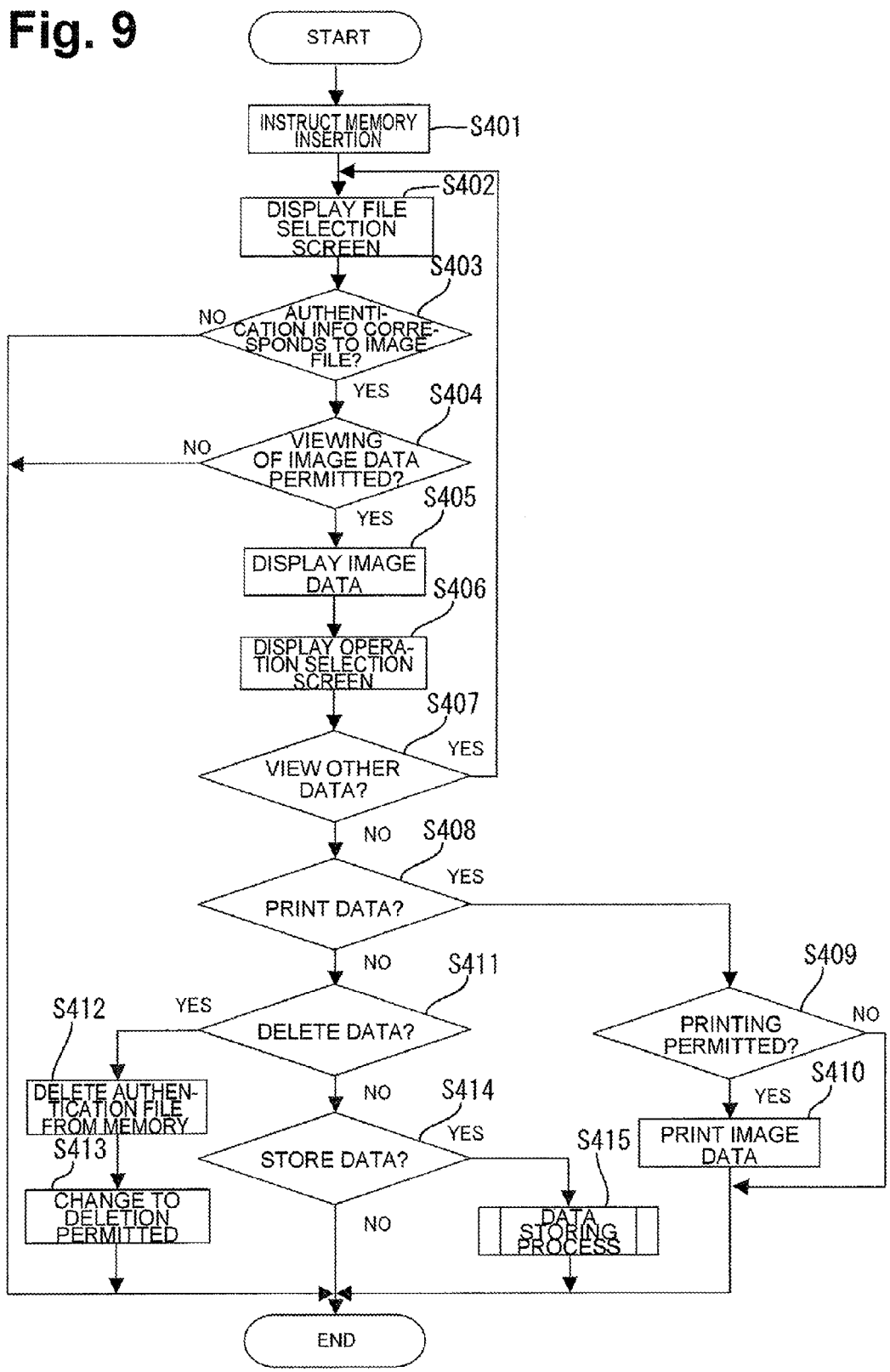
FIG. 9 is a flowchart showing a data output process according to an illustrative aspect.
Figure 10:
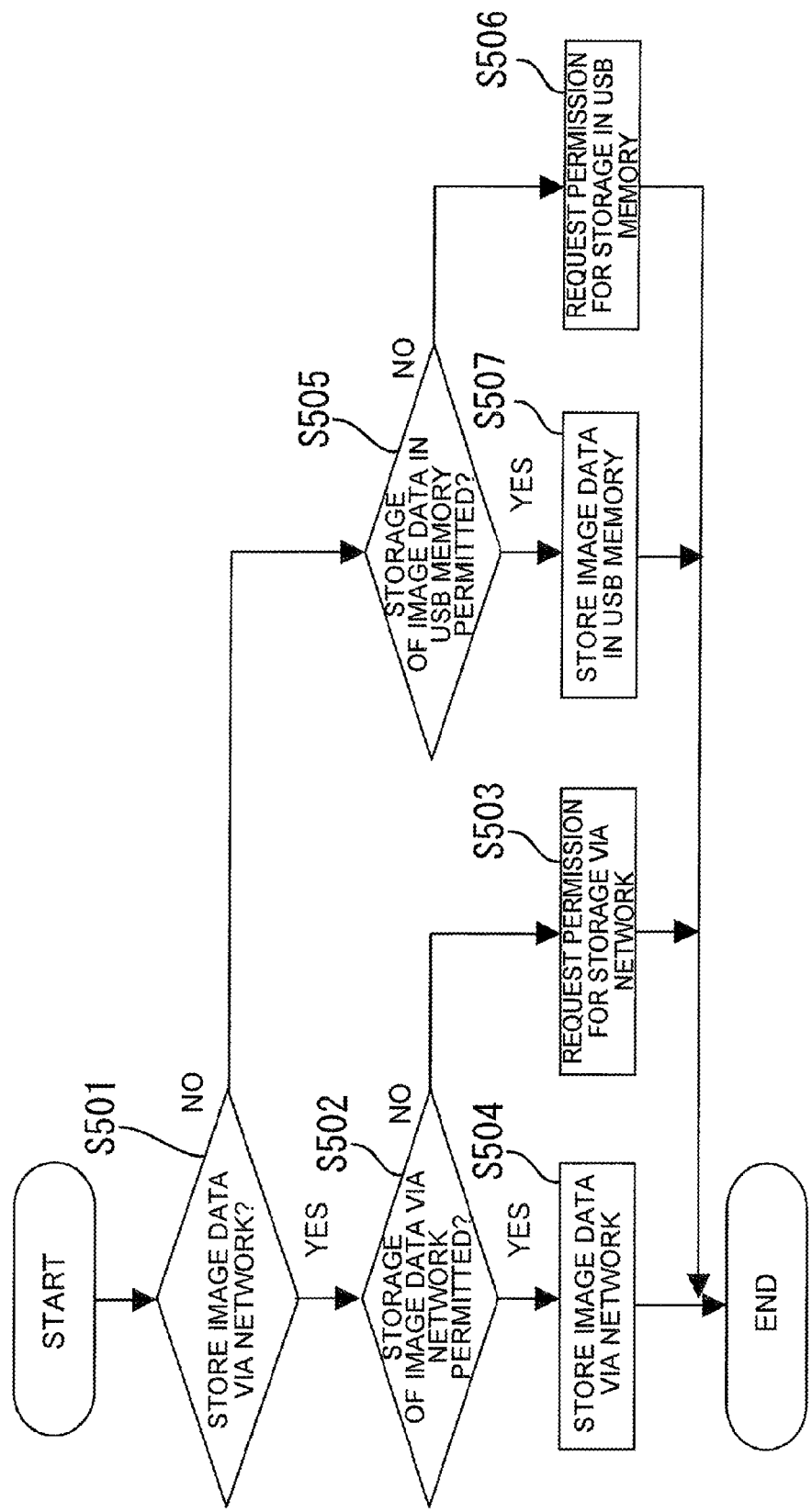
FIG. 10 is a flowchart showing a data storing process according to an illustrative aspect.

Referring to FIGS. 9 and 10, a data output process is discussed that is executed under the control of CPU 10.

The data output process may start when a user performs a predetermined operation on control panel 5 to use image data stored as a classified document in internal storage 18. Referring to FIG. 9, when the data output process starts, CPU 10 may display in display portion 6 a message encouraging the user to insert USB memory 25 into USB interface 16 in S401. When USB memory 25 is inserted into USB interface 16, display portion 6 may display a file selection screen in S402. The file selection screen may indicate e.g., names of authentication files and reference images stored in USB memory 25. While seeing the file selection screen, the user may select an authentication file which is subjected to data output, using control panel 5.

When an authentication file is selected, CPU 10, functioning as an authentication device, may decrypt the authentication information in the authentication file. CPU 10 may determine whether the decrypted authentication information corresponds to the name of the image file registered in the image database in S403. When the authentication information cannot be decrypted or does not correspond to the name of the image file registered in the image database (S403: NO), the data output process may end. If the authentication information corresponds to the name of the image file registered in the image database (S403: YES), CPU 10, as an authentication device, may determine whether viewing of the image data corresponding to the authentication information is permitted in the image database in S404. If the viewing of the image data is not permitted (S404: NO), the data output process may end. If the viewing of the image data is permitted (S404: YES), the corresponding image data may be read from internal storage 18. Display portion 6 may display the image data in S405, which has higher fidelity than the reference image data.

Then, display portion 6 may display an operation selection screen representing operation choices in S406. Operation choices may be e.g., "viewing other image data", "printing image data", "deleting image data", "storing image data via network", "storing image data in USB memory", and "ending process." The user may select one of the operation choices on control panel 5.

When "viewing other image data" is selected in the operation selection screen (S407: YES), flow may return to S402, in which a file to be viewed next may be selected. When "printing image data" is selected (S408: YES), CPU 10 may determine in S409 whether printing of the image data is permitted in the image database. When CPU 10 determines that printing of the image data is permitted in the image database (S409: YES), the image data stored in internal storage 18 may be read and converted into print data by image processing unit 19. Image forming unit 20 may execute printing in S410. When CPU 10 determines that printing of the image data is not permitted in the image database (S409: NO), printing may not be executed but the data output process may end.

When "deleting image data" is selected in the operation selection screen (S411: YES), the selected authentication file may be deleted from USB memory 25 in S412. The value of the deletion of the image data in the image database may be changed to the value representing "permitted" in S413. At this time, the image data stored in internal storage 18 may not be deleted. For example, an administrator may later check contents of the image data in the image database in which the deletion of the image data is permitted. If the administrator determines that the image data is unnecessary, the image data may be deleted from internal storage 18 by an operation of the administrator.

When "storing image data via network" or "storing image data in USB memory" is selected in the operation selection screen (S414: YES), a data storing process may be executed in S415. Referring to FIG. 10, when the data storing process starts, CPU 10 may determine in S501 whether "storing image data via network" is selected in the operation selection screen in S406. When "storing image data via network" is selected in S406 (S501: YES), CPU 10 may determine whether storage of the image data via network is permitted in the image database in S502.

When storage of the image data via network is not permitted in the image database (S502: NO), permission for storage may be requested to store the image data via network in S503. In this request, the image data may be registered in a list of image data waiting for permission stored in NVRAM 13. The administrator may later view the contents of the list and check the contents of the image data. The administrator may determine to change the value of storage of the image data via network in the image database to the value representing "permitted" or to keep the value representing "not permitted." When approval for storage is requested, the value representing "permission for storage requested" may be entered for the corresponding image data in the image database. The administrator may view the contents of the image database and change the values of the image database when necessary. The administrator may be notified of permission for storage being requested, by e-mail or other means.

When "storing image data via network" is permitted in the image database (S502: YES), the image data may be stored via network in S504. The image data may be read from internal storage 18 and transmitted via network interface 14 to a location, e.g., client computer 23 designated by the user.

When "storing image data in USB memory" is selected in the operation selection screen in S406 (S501: NO), CPU 10 may determine whether storage of the image data in USB memory 25 is permitted in S505. When storage of the image data in USB memory 25 is not permitted (S505: NO), permission for storage may be requested to store the image data in USB memory 25 in S506. Similarly to the permission for storage requested to store image data via network, the image data for which permission for storage in USB memory is requested may be registered in a list of image data waiting for permission. The administrator may later change the value of storage of the image data in USB memory to the value representing "permitted" or remained unchanged, i.e., "not permitted."

When storage of the image data in USB memory is permitted in the image database (S505: YES), the image data stored in internal storage 18 may be read and written into USB memory 25 inserted in to USB interface 16.

When the administrator changes the value of storage of the image data via network or storage of the image data in USB memory to the value representing "permitted", the image data may be stored via network or in USB memory 25.

According to this illustrative embodiment, image data obtained by reading an original document may be written into internal storage 18. Authentication information associated with the image data may be written into USB memory 25. When authentication information exists in USB memory 25, output, e.g., viewing, printing, storage, of the corresponding image data from internal storage 18 may be permitted. When authentication information does not exist in USB memory 25, output of image data from internal storage 18 may not be permitted. This structure may make it difficult to use image data written into internal storage 18 for a user who does not own USB memory 25 having authentication information written therein. Thus, security may be enhanced. Authentication may be conducted based on the authentication information written into USB memory 25, which may reduce the number of operations required for users for authentication.

Reference image data with lower fidelity than the image data written into internal storage 18 may be written into USB memory 25. Contents of the image data in internal storage 18 may be readily identified by referring to the reference image data. Reference image data may be lower in fidelity with respect to image data of an original document, so that use of reference image data by itself may be difficult. Thus, a security level may be maintained.

When an original document is determined as a non-sensitive document, output of its image data may be permitted. When an original document is determined as a classified or sensitive document, image data of the original document may be written into internal storage 18 and authentication information may be written into USB memory 25. Output of image data whose confidentiality needs to be maintained, may be restricted. Output of other image data may not be restricted to enhance convenience for users.

Authentication information may be written into USB memory 25, which is a transportable storage medium. This can facilitate management to maintain confidentiality.

The MFD 1 may include internal storage 18, as a built-in storage medium, configured to write image data therein. Therefore, as compared with a case in which image data is written into an external storage device, a security level may be readily enhanced.

A person having administrator authority may make approval with respect to outputs of image data, according to each of USB memories 25, which may improve security.

For example, a person having administrator authority may permit output of the image data, based on the contents of the image data stored in internal storage 18. Therefore, output of image data may be appropriately restricted according to each image data.

Figure 11:
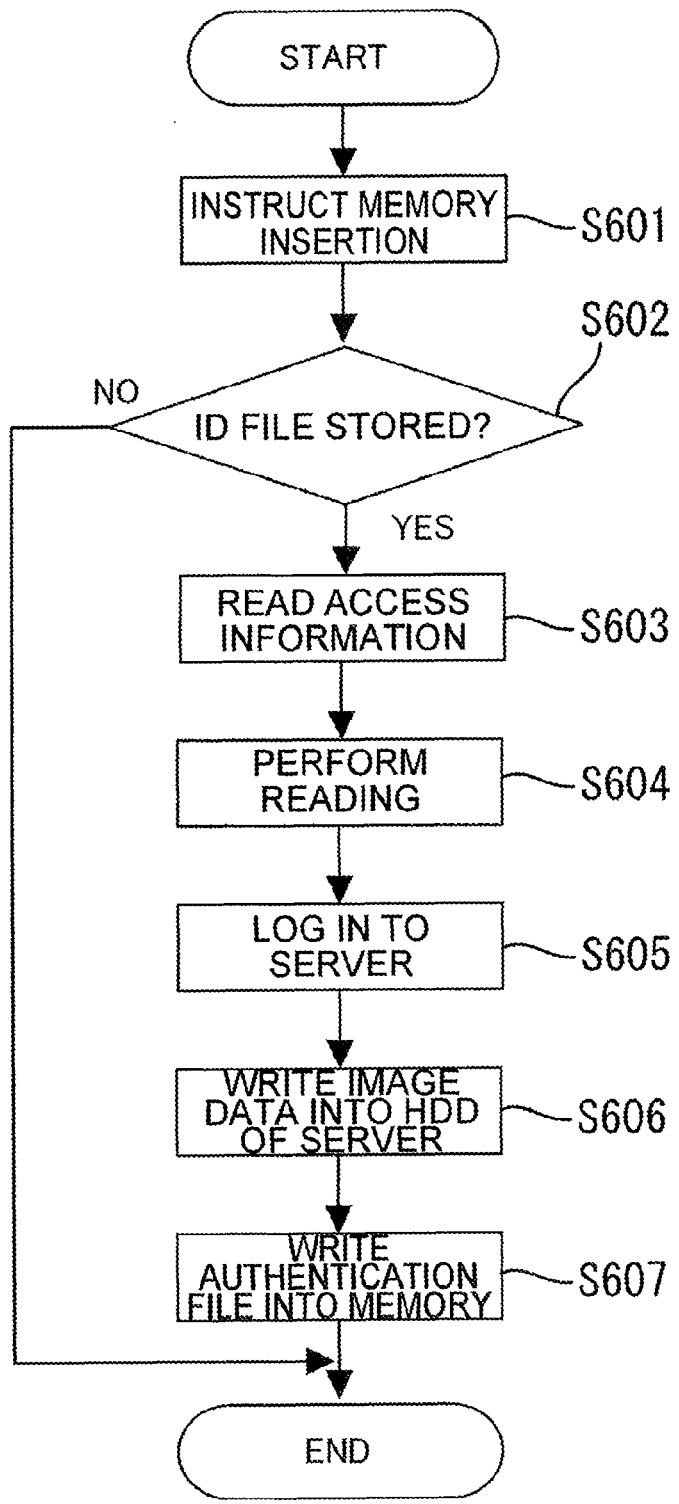
FIG. 11 is a flowchart showing of a classifying process according to another illustrative embodiment of the present invention.
Figure 12:
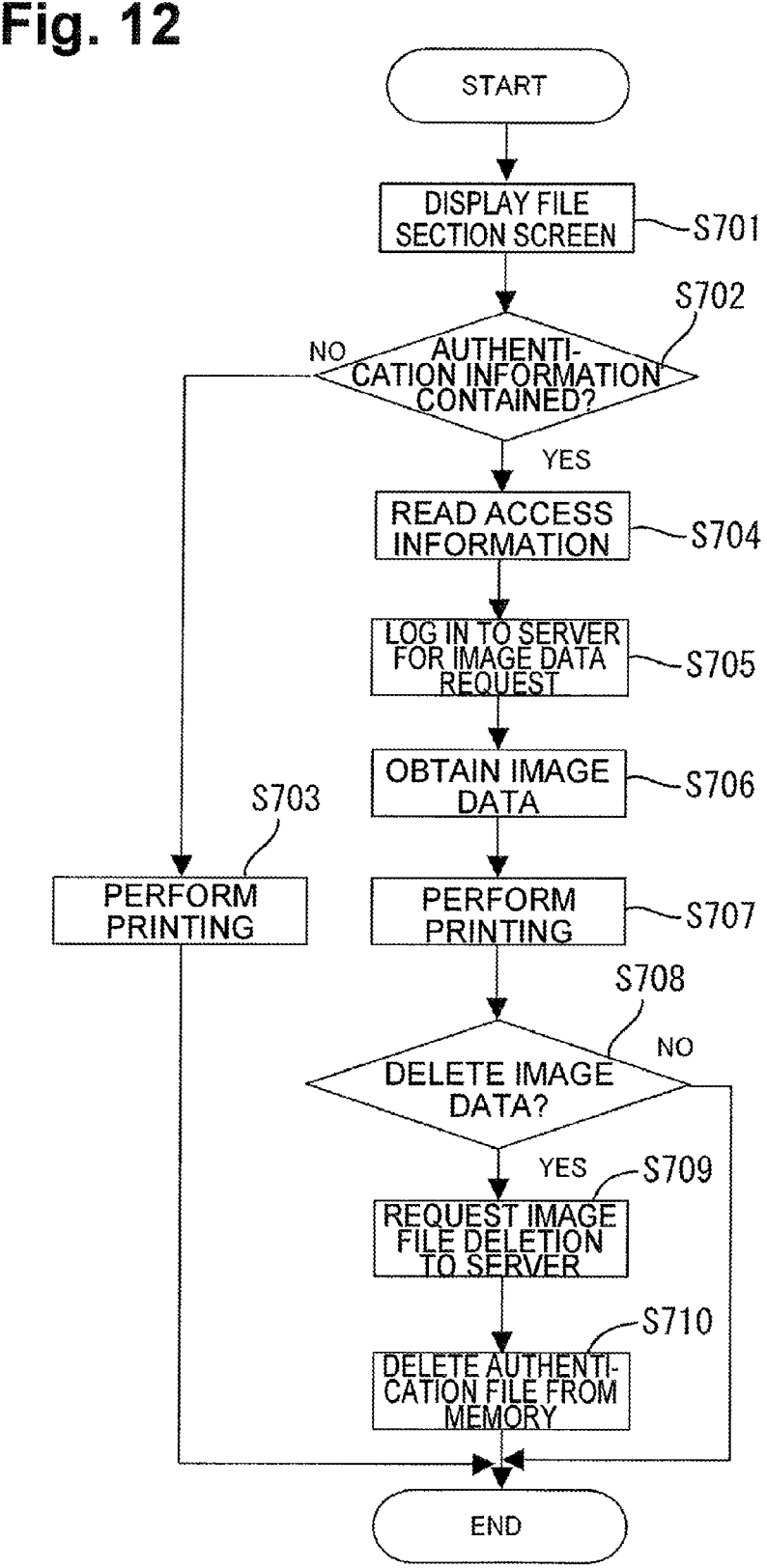
FIG. 12 is a flowchart showing a direct print process according to an illustrative aspect.

Another illustrative embodiment of the present invention is discussed referring to FIGS. 11 and 12. In an image processing system according to this illustrative embodiment, image data subjected to the classifying process may be stored in external server 22. General configuration of the image processing system may be similar to that shown in FIG. 2. The image processing system may be structured by connecting one or more servers 22, client computers 23, MFDs 1, and/or other printers, to communication lines 17. This illustrative embodiment is substantially similar to the above-described illustrative embodiment. Therefore, only those differences between this and above-described illustrative embodiments are discussed with respect to this illustrative embodiment.

A registration process for registering USB memory 25 in the memory management database may be performed in e.g., client computer 23 by a CPU thereof. Flow of the registration process of this illustrative embodiment is similar to that of FIG. 3 in the above-described illustrative embodiment. In this illustrative embodiment, a memory management database may be stored in HDD 22B of server 22 and a database corresponding to the image database of the above illustrative embodiment may not be provided. When information is obtained from or registered in the memory management database, communication will be conducted between server 22 and client computer 23.

An ID file generated in the registration process may include encrypted access information, e.g., a name and an address (IP address) of the server(s) accessible by a user, a user's login name, and a user's password, in addition to identification information specific to USB memory 25. As access authentication information, e.g., a user's login name and user's password, a name and password input e.g., to log in to a network from client computer 23 may be used. A user may be requested to input the access authentication information, e.g., a password when an ID file is generated.

Referring to FIG. 11, a classifying process performed under the control of CPU 11 of the MFD 1 is discussed. Similarly to FIG. 5 of the above illustrative embodiment, the classifying process may be performed in this illustrative embodiment when an original document is determined as a particular document.

When the classifying process starts, CPU 10 may display in display portion 6 a message encouraging the user to insert USB memory 25 into USB interface 16 in S601. When USB memory 25 is inserted into USB interface 16, CPU 10 may determine whether an ID file is stored in the USB memory 25 in S602. When an ID file is not stored in the USB memory 25 (S602: NO), flow may end without reading an original document.

When an ID file is stored in the USB memory 25 (S602: YES), the access information contained in the ID file may be read and decrypted in S603. Then, reading unit 3 may read the original document in S604. Using the access information, CPU 10 may log in to server 22 to store the image data in S605. When the access information contains servers that the user can log in to, the user may select one of the servers to store the image data.

Then, CPU 10 may transmit the image data to server 22 to store the image data. The image data may be written into a predetermined directory in HDD 22B of the server 22 in S606. CPU 10 may generate an authentication file corresponding to the image data stored in server 22. CPU 10 may write the authentication file in USB memory 25 in S607. The authentication file may include a file name of the image data stored in server 22, address information of storage location, e.g., a server name and a storage directory, and reference image data.

CPU 22A of server 22 may conduct access authentication with a predetermined program. CPU 22A may permit, with a predetermined program, the output of the image data stored in HDD 22B during the classifying process performed in the MFD 1, only when a request for the image data is made by the MFD 1 based on the authentication file.

Referring to FIG. 12, a direct print process is discussed. This process may be executed under the control of CPU 10 of the MFD 1. This process may be executed by the MFD 1 that has read image data stored in server 22 or by other MFDs 1.

The direct print process may start when a user inserts USB memory 25 into USB interface 16 and performs a predetermined operation on control panel 5. When the direct print process starts, CPU 10 may display a file section screen in display portion 6 in S701. The file selection screen may show names and contents of files, e.g., image files and text files, stored in USB memory 25. The user may select a file to print on control panel 5 while seeing the file section screen. When a file is selected, CPU 10 may determine whether the selected file is an authentication file containing authentication information in S702. If the selected file is a normal file that does not contain the authentication information (S702: NO), image forming unit 20 may print the content of the file in S703. When the selected file is an authentication file containing authentication information (S702: YES), the access information stored in the ID file stored in USB memory 25 may be read and decrypted in S704. Then, the storage location of the image data may be obtained from the authentication information. CPU 10 may log in to server 22 which stores the image data, to make a request of the image data in S705. CPU 22A of server 22 may read the requested image data from HDD 22B. CPU 22A may send the requested image data to the MFD 1 originating the request.

When CPU 10 of the MFD 1 receives the image data from server 22 in S706, image forming unit 20 may print an image based on the image data in S707. Then, CPU 10 may display in display portion 6 a screen to let the user to select the deletion of the image data in server 22 in S708. When the user selects and inputs the image data deletion on control panel 5 (S708: YES), CPU 10 may make a request to server 22 to delete the image file in S709. CPU 22A of server 22 may delete the corresponding image data from HDD 22B. CPU 10 of the MFD 1 may delete from USB memory 25 the authentication file corresponding to the deleted image data in S710. Then, the direct print process may end.

According to another illustrative embodiment of the present invention, image data read in the MFD 1 may be written into HDD 22B of server 22 connected to the MFD 1 via communication line 17. This structure may enable usage of image data from, e.g., other servers, client computer 23 or the MFD 1, via communication line 17.

A security level may be enhanced or increase with a double authentication, i.e., access authentication to server 22 and USB memory authentication in MFD 1, performed for the image data stored in server 22.

The access authentication information may be written into USB memory 25 and read when image data is output from server 22. Therefore, a number of operations for a user to input the access authentication information may be saved.

While the invention has been described in connection with various example structures and illustrative embodiments, it will be understood by those skilled in the art that other variations and modifications of the structures and illustrative embodiments described above may be made without departing from the scope of the invention. Other structures and illustrative embodiments will be apparent to those skilled in the art from a consideration of the specification or practice of the invention disclosed herein. It is intended that the specification and the described examples are illustrative with the true scope of the invention being defined by the following claims.

In the illustrative embodiments of the present invention, the authentication file may be generated as an image file. However, the authentication file may be structured as a file that does not include image data.

To determine whether an original document is a particular document, for example, a watermark on the original document may be read and be used for determination. Further, a RFID (Radio Frequency IDentification) tag attached to an original document may be detected to determine a particular document.

In another illustrative embodiment, the access authentication information for authentication for server access may be read from USB memory 25 to log in to server 22. Nevertheless, authentication for server access may be made using a user name and password input by a user on control panel 5.

USB memory 25 may function as a storage device. Nevertheless, a portable storage device, e.g., a memory card, may function as the storage device. Connection to the storage device may not be limited to USB but wireless data communication may be performed. In addition, a hard disk drive of a desktop computer may function as the storage device.

The illustrative embodiments are discussed in conjunction with the MFD 1 as an example of an image processing system. Nevertheless, the invention may be applied to an image processing system including at least a scanner function even if the image processing system does not include a printing function, a copying function, or a facsimile function.

Furthermore, aspects of the invention may be applied to another image processing system including at least an image reading device, a printer and a personal computer. The personal computer may be configured to connect to the image reading device and the printer for control. The image reading device may store image data corresponding to a scanned image in a storage element thereof. In this system, a USB memory may be attached to a USB port of the personal computer. The personal computer may write authentication information corresponding to the image read by the image reading device to an attached USB memory. Attaching the USB memory to the personal computer permits output, e.g., viewing, printing, transferring, of the image data stored in the image reading device. The above-mentioned process can be executed by the personal computer in which a program for executing the above-mentioned process is downloaded from a CD-ROM or via the internet and installed on the personal computer.

What is claimed is:

1. An image processing system comprising:
   a reading device configured to read an image on an original document;

a processing unit;
memory storing instructions thereon that, when executed by the processing unit, cause the processing unit to function as
a first writing device configured to write image data read by the reading device into image storage;
a communication device configured to communicate with a separately-portable storage medium;
a second writing device configured to transmit authentication information to the separately-portable storage medium, which is used to control output of the image data from the image storage;
a determination unit configured to determine whether the original document is a particular document; and
a control device configured to permit output of the image data read by the reading device when the determination unit determines that the original document is not the particular document and to control the first writing device to write the image data into the image storage and control the second writing device to write the authentication information into the separately-portable storage medium when the determination unit determines that the original document is the particular document.

2. The image processing system of claim 1, wherein the memory further stores instructions thereon that, when executed by the processing unit, cause the processing unit to function as an authentication device configured to permit output of the image data from the image storage when determining that the authentication information corresponding to the image data is stored in the separately-portable storage medium and to prohibit output of the image data from the image storage when the authentication information is not stored in the separately-portable storage medium.

3. The image processing system of claim 1, wherein the communication device is configured to be attached to the separately-portable storage medium.

4. The image processing system of claim 1, wherein the second writing device writes image data into the separately-portable storage medium having a fidelity lower than a fidelity of the image data written by the first writing device into the image storage.

5. The image processing system of claim 1, wherein the image storage is a built-in storage medium.

6. The image processing system of claim 1, wherein the image storage is a component of an information processing device connected to the image processing system via a communication line.

7. The image processing system of claim 6, wherein the memory further stores instructions thereon that, when executed by the processing unit, cause the processing unit to function as an input device configured to receive access authentication information to access the information processing device.

8. The image processing system of claim 7, wherein the second writing device is configured to write the access authentication information in the separately-portable storage medium, and the input device is configured to read the access authentication information from the separately-portable storage medium when the image data is output from the image storage.

9. The image processing system of claim 1, further comprising a printing device configured to print an image based on the image data that is permitted to be output from the image storage.

10. The image processing system of claim 1, further comprising a display device configured to display an image based on the image data that is permitted to be output from the image storage.

11. The image processing system of claim 1, wherein the memory further stores instructions thereon that, when executed by the processing unit, cause the processing unit to function as:
an approval registration device configured to register approval status information indicative of approval or non-approval of output of the image data for each of a plurality of separately-portable storage media;
an approval device configured to approve output of the image data from the image storage when the authentication information is stored in the separately-portable storage medium and the approval status information indicates approval with respect to the separately-portable storage medium, and to not approve output of the image data from the image storage when the authentication information is stored in the separately-portable storage medium and the approval status information indicates non-approval with respect to the separately-portable storage medium.

12. The image processing system of claim 1, wherein the memory further stores instructions thereon that, when executed by the processing unit, cause the processing unit to function as:
a permission registration device configured to register data basis information indicative of permission or prohibition of output of the image data written in the image storage;
a permission device configured to permit output of the image data from the image storage when the authentication information is stored in the separately-portable storage medium and the data basis information for the image data corresponding to the authentication information indicates permission, and to prohibit output of the image data from the image storage when the authentication information is stored in the separately-portable storage medium and the data basis information for the image data corresponding to the authentication information indicates prohibition.

13. One or more non-transitory computer readable media having computer-executable instructions stored thereon for use in an image processing system including a reading device configured to read an image on a document, wherein when executed by a processor, the instructions performing the steps of:
writing image data read by a reading device into image storage;
writing authentication information associated with the image data into a separately-portable storage medium;
permitting output of the image data corresponding to the authentication information from the image storage when the authentication information is stored in the separately-portable storage medium;
prohibiting output of the image data from the image storage when the authentication information is not stored in the separately-portable storage medium;
determining whether the document is a particular document;
permitting output of the image data read by the reading device when the document is not the particular document; and
controlling the writing of the image data into the image storage and the writing of the authentication information into the separately-portable storage medium when the document is the particular document.

14. A method of outputting image data, comprising the steps of:
   retrieving an image;
   writing image data corresponding to the retrieved image into image storage;
   communicating with a separately-portable storage medium;
   transmitting authentication information through the separately-portable storage medium, which is used to control output of the image data from the image storage;
   determining whether the document is a particular document;
   permitting output of the retrieved image data when the document is not the particular document; and
   writing the image data into the image storage and writing the authentication information into the separately-portable storage medium when the document is the particular document.

15. The method of outputting image data according to claim 14, wherein the retrieving includes reading an image on an original document.

16. The method of outputting image data according to claim 14, further including the steps of:
   permitting output of the image data from the image storage when determining that the authentication information corresponding to the image data is stored in the separately-portable storage medium; and
   prohibiting output of the image data from the image storage when the authentication information is not stored in the separately-portable storage medium.

* * * * *